United States Patent [19]

Hasegawa

[11] 4,359,275
[45] Nov. 16, 1982

[54] SINGLE LENS REFLEX CAMERA SYSTEM CAPABLE OF TTL FLASH OUTPUT CONTROL

[75] Inventor: Hiroshi Hasegawa, Tokyo, Japan

[73] Assignee: Nippon Kogaku K.K., Tokyo, Japan

[21] Appl. No.: 215,345

[22] Filed: Dec. 11, 1980

[30] Foreign Application Priority Data

Dec. 21, 1979 [JP] Japan .............................. 54-165661
Feb. 5, 1980 [JP] Japan .............................. 55-12680
Feb. 22, 1980 [JP] Japan .............................. 55-20643

[51] Int. Cl.³ ............................................ G03B 15/05
[52] U.S. Cl. ...................................... 354/33; 354/34; 354/56; 354/59
[58] Field of Search .................. 354/23 R, 32, 33, 34, 354/56, 59, 60 F

[56] References Cited

U.S. PATENT DOCUMENTS 3,726,197  4/1973  Hasegawa et al. ............... 354/33 X
4,064,517  12/1977  Maitani et al. .................... 354/56 X
4,097,876  6/1978  Uno et al. ........................ 354/59 X
4,192,590  3/1980  Kitaura ............................. 354/33 X

Primary Examiner—Michael L. Gellner

Attorney, Agent, or Firm—Fitzpatrick, Cella, Harper & Scinto

[57] ABSTRACT

A single lens reflex camera system capable of TTL flash output control of a flash unit which enables transmission light from the phototaking lens from a movable mirror device to a light receiving device when the mirror device is in one position and from a film surface to the light receiving device when the mirror is in a second position, the light receiving device generating a signal corresponding to the quantity of light it receives. A trigger circuit enables flash tube actuation upon film exposure and a control device controls the quantity of light emission of the tube in response to the output of the light receiving device. The trigger circuit is actuated when the mirror device is in the one position by an actuating device which includes circuitry for correcting the response of the control device of the output of the light receiving device in accordance with the difference, with respect to the same object, between the quantity of light incident on the light receiving device when the mirror device is in the one position and the quantity of light incident on the light receiving device when the mirror device is in the second position.

6 Claims, 6 Drawing Figures

SINGLE LENS REFLEX CAMERA SYSTEM CAPABLE OF TTL FLASH OUTPUT CONTROL

BACKGROUND OF THE INVENTION

1. Field of the Invention

This invention relates to a single lens reflex camera system which is capable of TTL flash output control of a flash unit.

2. Description of the Prior Art

Recently, the so-called TTL flash output control system has been widely carried out in flash photography. This TTL flash output control system is such that the flashlight emitted from a flash unit and reflected by an object and passed through the lens of the camera and reflected by the film surface of the camera is received by a light-receiving device within the camera and the light emission of the flash unit is stopped on the basis of the metering output of the light-receiving element of the light-receiving device. Single lens reflex cameras are known in which during flash photography, the above-described TTL flash output control is effected and during ordinary photography, automatic exposure control is effected on the basis of the TTL metering value while, at the same time, a proper shutter time and a proper exposure value such as a proper aperture value which are to be automatically controlled are displayed. In the single lens reflex cameras of this type, the light-receiving device is disposed on the underside of the mirror box of the camera to receive the reflected light from the film during TTL flash output control. Accordingly, when the quick return mirror is in an observation position, namely, a position in which the light passed through the objective lens is reflected to the viewfinder system, the light passed through the objective lens does not impinge on the light-receiving device and therefore, another light-receiving device becomes necessary to obtain a metering output for displaying a proper exposure value and said another light-receiving device is disposed within the viewfinder system. However, such provision of two light-receiving devices in the camera results in an increased cost and also aggravates the availability of the space within the camera, and further leads to a disadvantage that the regulation for correctly displaying the exposure information and the regulation for correctly effecting the exposure control become entirely independent of each other and thus, the regulations require much time and it is very difficult to make the characteristics of the two regulations coincident with each other.

SUMMARY OF THE INVENTION

It is an object of the present invention to provide an improved single lens reflex camera which is capable of TTL flash output control.

It is another object of the present invention to provide an improved single lens reflex camera which is controllable by the output from a light-receiving element receiving the photographing light reflected by the shutter curtain surface or the film surface.

It is still another object of the present invention to provide a single lens reflex camera system including said camera.

The single lens reflex camera according to the present invention includes a metering circuit including a single light-receiving element disposed outside of the photographing light path in a mirror box so as to be capable of receiving the reflected light from the shutter curtain surface or the film surface; and a quick return mirror device including a main mirror having a surface area for transmitting therethrough part of entering light and movable between an observation position crossing the photographing light path and a photographing position retracted out of the photographing light path, and an auxiliary mirror operatively associated with the main mirror so that in the observation position of the main mirror, it reflects the light passed through said transmitting area to the light-receiving element and in the photographing position of the main mirror, it is retracted out of the photographing light path with the main mirror; and wherein the output of the metering circuit for the same object is substantially equal between the observation position and the photographing position of the main mirror.

According to an embodiment of the present invention, the transmitting factor of the main mirror and the reflection factor of the auxiliary mirror are determined so that the quantity of light passed through the main mirror and reflected by the auxiliary mirror and impinging on the light-receiving element and the quantity of light reflected directly by the shutter curtain surface or the film surface and impinging on the light-receiving element are substantially the same for the same object.

According to another embodiment of the present invention, the output level from the metering circuit may be varied by a level regulating circuit including a switch responsive to displacement of the quick return mirror device.

According to still another embodiment of the present invention, the output of the light-receiving element is directed to the metering circuit of an electronic flash unit mounted on said camera, and the electronic flash unit is provided with a flash output control circuit for controlling the quantity of emitted light on the basis of the output of the metering circuit, a control circuit which enables light emitting operation by any of a synchro signal synchronized with the shutter release of the camera and a preparatory light emission signal operable separately from the release, and a circuit for displaying the operative condition of the flash output control circuit during the light emission by the preparatory light emission signal, and the control circuit is designed to correct the flash output control circuit between the operation by the synchro signal and the operation by the synchro signal and the operation by the preparatory light emission signal.

The invention will become more fully apparent from the following detailed description thereof taken in conjunction with the accompanying drawings.

DESCRIPTION OF THE PREFERRED EMBODIMENTS

Figure 1:
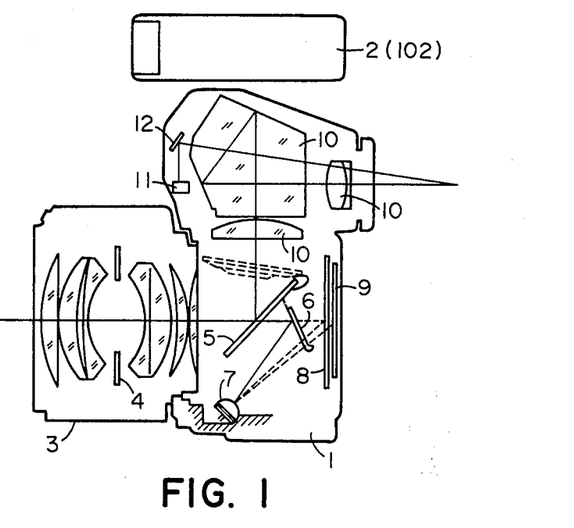
FIG. 1 shows the arrangement of the single lens reflex camera system according to an embodiment of the present invention.

FIG. 1 shows the arrangement of the single lens reflex camera system according to an embodiment of the present invention. The single lens reflex camera system comprises a single lens reflex camera body 1 and a flash unit 2 such as a speed light. The flash unit 2 is connected to the camera body 1 by electrical connecting means, not shown, and can emit flashlight in synchronism with the closing of a synchroswitch within the body 1. The camera body 1 further has an objective lens 3, a diaphragm 4 and a quick return mirror 5. The mirror 5, when in an observation position indicated by solid line, reflects upwardly the light passed through the lens 3, and before exposure of film, it is retracted out of the photographing light path and moves to a photographing position indicated by dotted line. The mirror 5 has a partly light-transmitting portion in the center thereof. An auxiliary reflecting member 6 is attached to the mirror 5 and, when the mirror 5 is in the observation position, the auxiliary reflecting member reflects the light passed through the partly light-transmitting portion of the mirror 5 toward a light-receiving device 7 including a photodiode, etc. disposed on the underside of a mirror box. When the mirror 5 is in the photographing position, the auxiliary reflecting member comes into intimate contact with the mirror 5 so as not to cut off the photographing light path. The light-receiving device 7 can receive the reflected light from the reflecting member 6 and the reflected light from a shutter curtain or film surface. In FIG. 1, reference numeral 8 designates a focal plane shutter and reference numeral 9 denotes a film. Designated by 10 is a viewfinder optical system comprising a focusing screen, a pentaprism and an eyepiece. Denoted by 11 is a proper exposure value display device including display elements such as LED, liquid crystal, meter, etc. and displays a proper exposure value such as proper shutter time or proper aperture value. A reflecting member 12 directs the display content of the display device 11 to the viewfinder optical system.

The light transmitting factor of the entire mirror 5 including the partly light-transmitting portion and the reflection factor of the auxiliary reflecting member 6 are determined so that the quantity of light passing through the mirror 5 and auxiliary reflecting member 6 to the light-receiving device 7 when the mirror 5 is in the observation position and the quantity of light reflected by the shutter curtain or the film surface and reaching the light-receiving device 7 when the mirror 5 is in the photographing position are substantially the same for the same object. Accordingly, the output of the light-receiving device is substantially at the same level irrespective of the position assumed by the mirror 5.

This embodiment has been described with respect to a case where, during viewfinder observation, the light passed through the phototaking lens is directed to the light-receiving device 7 only through the mirror 5 and the auxiliary reflecting member 6, but even in a case where a light-decreasing filter or the like is disposed in front of the light-receiving device 7 during observation, the transmitting factor and reflection factor of the whole of the mirror 5, reflecting member 6 and filter may be determined so that the quantity of light incident on the light-receiving device 7 during photographing and the quantity of light incident on the light-receiving device 7 during observation are equal to each other.

A second embodiment of the present invention will now be described by reference to FIGS. 1 and 2.

Figure 2:
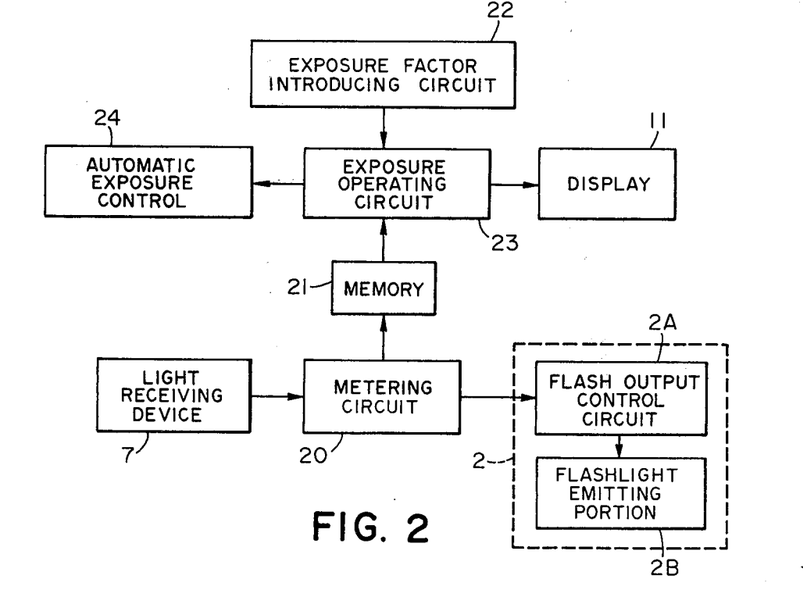
FIG. 2 is a block diagram of a second embodiment of the present invention.

Referring to FIG. 2 which is a block diagram of the second embodiment, a metering circuit 20 logarithmically compresses the photoelectric output of the light-receiving device 7 and generates an amplified metering output. The light-receiving device 7 and this circuit 20 together constitute metering means.

A memory circuit 21 is responsive to shutter release operation to store the metering output immediately before upward movement of the quick return mirror 5.

An exposure factor introducing circuit 22 is a circuit which generates an output corresponding to the set values of exposure factors such as film speed and manually set shutter time or manually set aperture value.

An exposure operating circuit 23 operates a proper exposure value such as proper shutter time or proper aperture value from the metering output of the metering circuit 20 passed through the memory circuit 21 and the output of the introducing circuit 22.

An automatic exposure control device 24 controls the shutter 8 and the diaphragm 4 on the basis of the proper exposure value of the operating circuit 23.

A flash output control circuit 2A is a circuit which generates a signal for stopping the emission of flashlight. A flashlight emitting portion 2B is contained in the flash unit 2 with the flash output control circuit 2A and generates flashlight.

The operation of the present embodiment will now be explained.

(1) The case of automatic exposure control photography

The light-receiving device 7 receives the light from the object passed through the lens 3 and the partly light-transmitting portion of the mirror 5 and reflected by the reflecting member 6. The exposure operating circuit 23 calculates a proper exposure value from the metering output of the metering circuit 20 passed through the memory circuit 21 and the exposure factor output of the introducing circuit 22. The display device 11 displays this proper exposure value to the viewer through the viewfinder optical system 10.

When shutter release operation is effected, the memory circuit 21 stores therein the metering output immediately before upward movement of the mirror 5. The operating circuit 23 calculates a proper exposure value on the basis of the stored metering output, and the control device 24 controls the shutter 8 and the diaphragm 4 in accordance with this proper exposure value.

(2) The case of flash photography

When the mirror 5 is moved upwardly by shutter release operation and retracted from the photographing light path and then the shutter 8 becomes fully open, the flashlight emitting portion 2B emits flashlight by closing of a synchroswitch, not shown, and the film 9 is exposed to the flashlight reflected by the object. The light-receiving device 7 receives the reflected light from the film 9. The flash output control circuit 2A stops the light emission of the flash unit 2 when the metering output of the metering circuit 20 resulting from the reflected light from the film 9 has become a predetermined amount.

In this manner, all of the proper exposure value display device 11, the automatic exposure control device 24 and the flash output control circuit 2A respond to the output of the same light-receiving device 7.

The flash output control of the flash unit 2 is impossible when, for example, the object is at a far distance, since the maximum quantity of flashlight emitted from the flash unit 2 is limited. Therefore, it would be convenient if only the flash unit 2 is operated to effect preparatory light emission prior to flash photography and whether or not flash output control is possible is discriminated thereby and displayed.

A third embodiment of the present invention which will hereinafter be described intends to utilize the light-receiving device used during the flash output control of actual flash photography also as the light-receiving device for such preparatory light emission.

Figure 3:
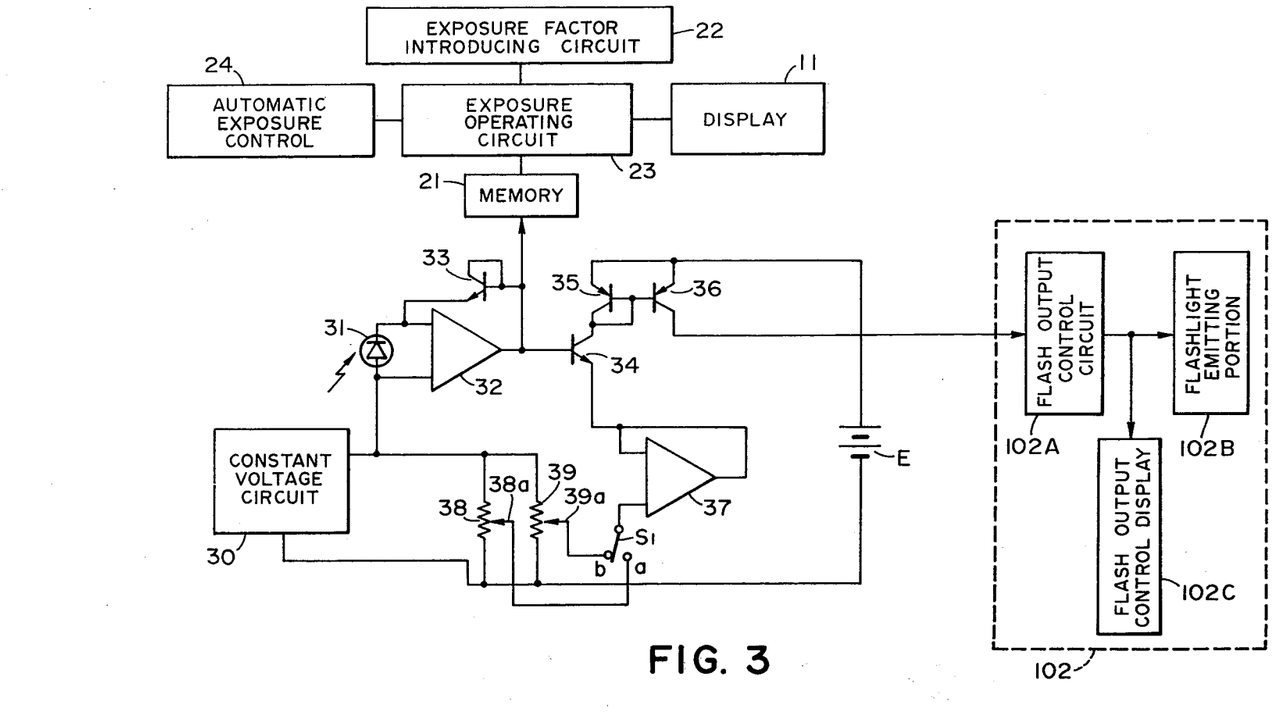
FIG. 3 is a circuit diagram of a third embodiment of the present invention.

FIG. 3 is a circuit diagram of the third embodiment. This device has a power source E, a constant voltage source 30 generating a voltage proportional to absolute temperature, a photodiode 31 working as the photoelectric element of the light-receiving device 7, and an operational amplifier 32. In FIG. 3, reference numeral 33 designates a logarithmically compressing transistor connected to a diode, and the operational amplifier 32 and the transistor 33 together constitute a logarithmically compressing circuit for logarithmically compressing a photocurrent proportional to the light intensity of the diode 31. A logarithmically elongating transistor 34 elongates the logarithmically compressed output of the operational amplifier 32 and produces a collector current proportional to the intensity of the light incident on the diode 31.

In FIG. 3, reference numerals 35 and 36 designate transistors forming a current mirror circuit, reference numeral 37 denotes a voltage follower, and reference numeral 38 designates a potentiometer. A constant voltage resulting from dividing the output voltage of the constant voltage source 30 is produced at the slider 38a of the potentiometer 38.

Reference numeral 39 also designates a potentiometer. A constant voltage resulting from dividing the output voltage of the constant voltage source 30 is produced at the slider 39a of the potentiometer 39. The potentials of the sliders 38a and 39a are set so that the difference in the photocurrent of the diode 31 resulting from the difference in the metering optical system between during the preparatory light emission and during the actual flash photography is compensated and the current of the transistor 34 becomes equal when the light passed through the lens 3 is equal during the preparatory light emission and during the flash photography. These potentiometers 38 and 39 together constitute a level regulating circuit.

A change-over switch S1 is responsive to shutter release operation and is connected to a contact a when the mirror 5 is in the observation position, and connected to a contact b when the mirror 5 is in the photographing position. The contacts a and b are connected to the sliders 38a and 39a, respectively.

The outputs of the logarithmically compressing circuits 32, 33 are connected to the memory circuit 21, which in turn is connected to the exposure operating circuit 23 as in the second embodiment, and the circuit 23 is connected to the introducing circuit 22, the control device 24 and the display device 11.

A flash unit 102 contains therein a flash output control circuit 102A, a flashlight emitting portion 102B and a flash output control display device 102C.

The flash output control circuit 102A includes an integrating circuit for integrating the collector current of a transistor 36 and, when the integrated value thereof has become a predetermined value, the flash output control circuit generates a flash output control signal for stopping the light emission of the flashlight emitting portion 102B.

The flash control display device 102C effects flash output control display when it receives the flash output control signal from the flash output control circuit 102A, or effects flash output control impossibility display when it does not receive the flash output control signal. Of course, it may effect both of the two displays.

The operation of the third embodiment will now be explained.

(1) The case of automatic exposure control photography

Entirely similarly to the second embodiment, when the light-receiving device 7 receives the object light passed through the partly light-transmitting portion of the mirror 5 in the observation position and reflected by the reflecting member 6, the logarithmically compressing circuits 32, 33 of FIG. 3 generate a logarithmic compression output proportional to the logarithm of the light intensity, and this is introduced through the memory circuit 21 into the exposure operating circuit 23, where a proper exposure value is calculated. This value is displayed by the display device 11. By shutter release operation, the logarithmic compression output immediately before upward movement of the mirror 5 is memorized and on the basis thereof, the exposure control by the control device 24 is effected.

(2) The case of preparatory light emission

First, an unshown trigger switch provided on the flash unit 102 to know in advance whether or not the flash photography conditions such as the object distance, film speed, aperture value, etc. are capable of flash output control is operated to cause the light emitting portion 102B to emit flashlight. Since the shutter release operation of the camera 1 is effected in no way, the flashlight reflected by the object passes through the lens 3 and via the mirror 5 and the reflecting member 6 to the light-receiving device 7. Accordingly, the logarithmically compressing circuits 32, 33 apply a logarithmic compression voltage proportional to the logarithm of the incident light to the base of transistor 34. At this time, the mirror 5 is in the observation position and the switch S1 is connected to the contact a and therefore, the voltage of the slider 38a is applied to the emitter of the transistor 34 through the voltage follower 37. Thus, a collector current corresponding to the difference between the logarithmic compression voltage and the voltage of the slider 38a flows through the transistor 34 and the same collector current also flows to transistor 36 by the current mirror circuits 35, 36. The collector current of this transistor 36 is integrated by the integrating circuit of the flash output control circuit 102A and, when this integrated value becomes a predetermined value, a flash output control signal is produced to stop the light emission of the light emitting portion 102B while, at the same time, the display device 102C effects flash output control display. If the integrated value does not reach the predetermined value, the flash output control signal is not produced and so, the display device 102C does not effect flash output control display but effects flash output control impossibility display. When the result of this preparatory light emission is capable of flash output control, the photographer continuedly carries out the shutter release operation of the camera to effect flash photography and, if said result is not capable of flash output control, the photographer must change the abovedescribed flash photography conditions.

(3) The case of flash photography

When shutter release operation is effected for flash photography, the mirror 5 is upwardly moved to the photographing position and the shutter 8 becomes fully open and the light emitting portion 102B emits flashlight. When the light-receiving device 7 receives the reflection of this flashlight from the film surface, a logarithmic compression voltage proportional to the logarithm of the intensity of that light is applied to the base of the transistor 34. On the other hand, at this time, the mirror 5 is in the photographing position and the switch S1 is connected to the contact b and therefore, the voltage of the slider 39a is applied to the emitter of the transistor 34 through the voltage follower 37. Accordingly, a collector current corresponding to the difference between the two voltages flows to the transistor 34, and the same collector current as this also flows to the transistor 36. The flash output control circuit 102A integrates the collector current of this transistor 36 and produces a flash output control signal to stop the light emission of the light emitting portion 102B and effect flash output control. The display device 102C effects flash output control display.

In this manner, the metering light path during the preparatory light emission is formed by the lens 3, the mirror 5 and the reflecting member 6, and the metering light path during flash photography is formed by the lens 3 and the film 9, and the two metering light paths differ from each other and therefore, even if the light incident on the lens 3 is the same, the intensity of the light incident on the light-receiving device 7 differs between during the preparatory light emission and during the flashlight emission. Since the electrical output supplied to the flash output control circuit 102A is corrected by the change-over switch S1 operatively associated with the movement of the mirror 5, the same light-receiving device 7 can be utilized both during the preparatory light emission and during the flashlight emission.

In the present embodiment, the metering output of the camera is applied to the flash output control circuit 102A within the flash unit 102 in the form of a current and therefore, a protective circuit for the case where the collector of the transistor 36 is grounded for some cause or other when the camera and the flash unit are electrically connected together may be eliminated.

Of course, the flash output control circuit 102A may alternatively be provided on the camera side.

In order that the difference in the metering light path between during the preparatory light emission and during flash photography may be compensated for so that, when flashlight of the same intensity is incident on the lens 3, the flash output control device produces the same result during the preparatory light emission and during flash photography, the level of the predetermined value for reference of the integrating circuit within the flash output control circuit 102A may be regulated. This regulation may be effected with the displacement of the mirror 5 between the photographing position and the observation position as in the third embodiment, or may be effected on the basis of the difference between the light emitting operation by a synchroswitch and the light emitting operation by a manually operable switch during preparatory light emission as in a fourth embodiment of the present invention which will hereinafter be described.

Figure 4:
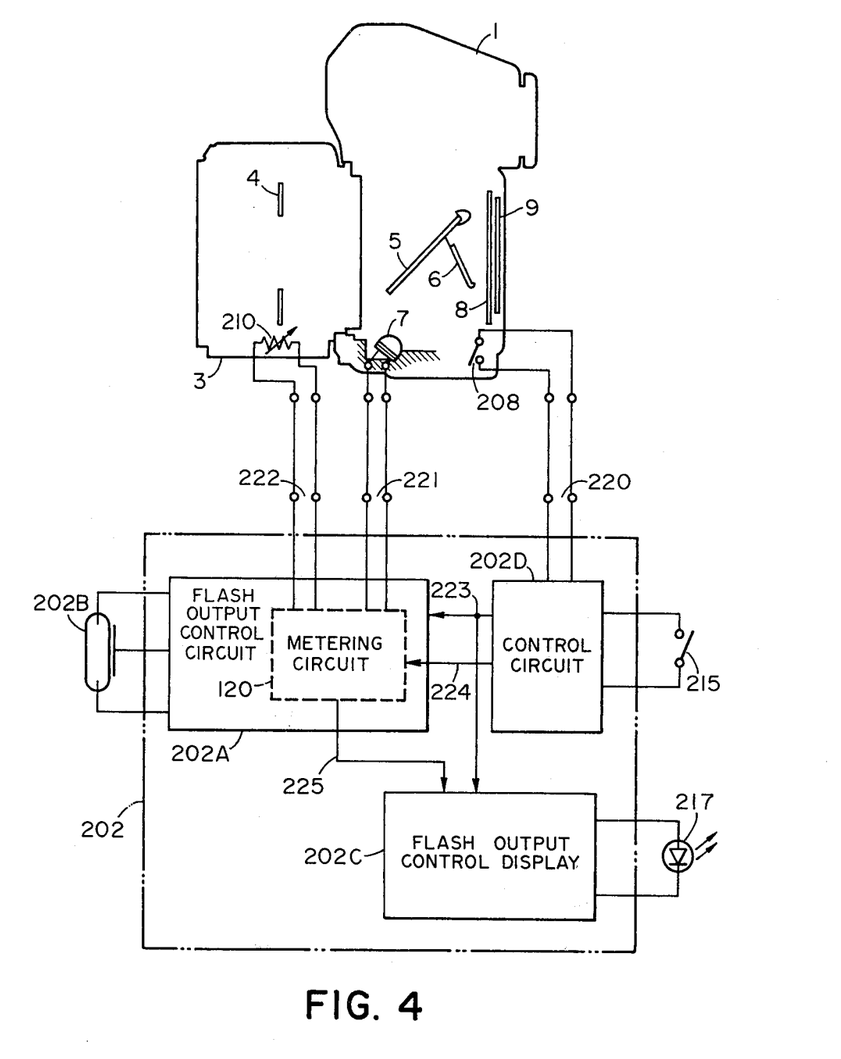
FIG. 4 is a block diagram of a fourth embodiment of the present invention.

Referring to FIG. 4 which shows the fourth embodiment of the present invention, a flash unit 202 has a flash output control circuit 202A including a metering circuit 120, a control circuit 202D and a flash output control display circuit 202C. The metering circuit 120 receives as input the output signal 221 of the light-receiving device 7 and the aperture signal 222 by the resistance value of a variable resistor 210 operatively associated with the aperture preset ring (not shown) of the phototaking lens 3, and the control circuit 202D receives as input a synchrosignal 220 produced by the closing of a synchroswitch 208 occurring immediately after the shutter 8 of the camera 1 has been fully opened and a signal produced by the closing of a switch 215 for preparatory light emission. Further, this control circuit 202D puts out to the flash output control circuit 202A a start signal 223 for starting the light emission of a light emitting portion 202B including a flashlight discharge tube, and also puts out to the metering circuit 120 a correction signal 224 for effecting the correction of the metering sensitivity only during the closing of the switch 215. The display circuit 202C receives as input the start signal 223 and a flash output control signal 225 for stopping the light emission of the light emitting portion 202B by the metering operation result of the metering circuit 120 through the flash output control circuit 202A, and light emission is effected after the start signal 223 has been applied, and when there is no application of the flash output control signal 223, the display circuit drives a light-emitting diode 217 to give a warning for a predetermined time after the light emission.

Figure 5:
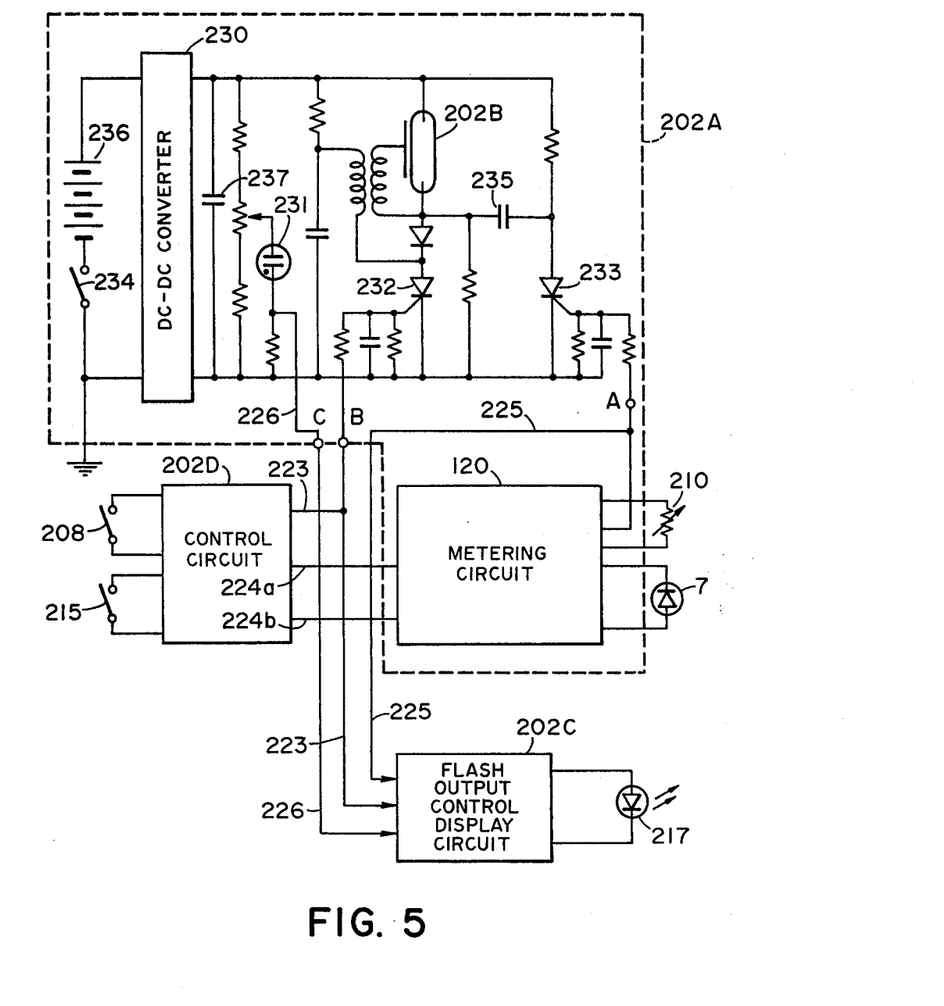
FIG. 5 is a circuit diagram showing the details of the flash output control circuit 202A of FIG. 4.

FIG. 5 shows the driving circuit portion for the light emitting portion 202B of the flash output control circuit 202A and the connection with each block in FIG. 4. When a main switch 234 is closed, a conventional DC-DC converter 230 begins to produce a high voltage. A main capacitor 237 for charging electric charge for discharging is connected to the output end of the DC-DC converter 230. When the charging of this main capacitor 237 progresses and the high voltage output of the DC-DC converter 230 reaches a predetermined value, a neon tube 231 discharges and is turned on and although not shown in FIG. 4, a ready signal 226 indicative of the flash preparation completion is transmitted to the display circuit 202C.

When a synchroswitch 208 provided in the camera 1 or a preparatory light emission switch 215 provided in the flash unit 202 is closed, the start signal 223 is put out from the control circuit 202D for a predetermined time. The start signal 223 turns on a main thyristor 232 and starts the light emission of the light emitting portion 202B. At the same time, the start signal 223 is applied to the flash output control display circuit 202C to report that the light emission has been started.

Now, when the preparatory light emission switch 215 has been closed, the control circuit 202D puts out the correction signal 224 to the metering circuit 120. On the other hand, when the synchroswitch 208 has been closed, this correction signal 224 is not put out. The correction signal 224 includes a correction signal 224a for applying the information of the reflection factor which corrects the difference in reflection factor between the mirror during the ordinary metering by the light-receiving device 7 and the film surface during the film surface metering, and a correction signal 224b for applying aperture information which effects a correction corresponding to the difference in quantity of phototaking light between during the opening of the diaphragm blade and during the stop-down.

Now, when the light emission of the light emitting portion 202B is started and the phototaking light having passed through the phototaking lens 3 reaches a proper quantity of light, that is, the quantity of emitted light reaches a necessary quantity of light, the metering circuit 120 puts out a flash output control signal 225. This signal 225 turns on an auxiliary thyristor 233 and reversely biases the main thyristor 232 into a turned-off state by the charge of the capacitor 235. Accordingly, the light emitting portion 202B stops the light emission. At the same time, this flash output control signal 225 is applied to the flash output control display circuit 202C to report that the light emission has been stopped. When the photographing condition is outside of the flash output control range of the flash output control circuit 202A, the flash output control signal 225 is not put out.

Also, when the light emitting portion 202B emits light, the high output voltage of the DC-DC converter 230 drops and thus, the outputting of the ready signal 226 is interrupted. That is, the ready signal 226 is put out only when the neon tube 231 is turned on.

The flash output control display circuit 202C if there is no application of the flash output control signal 225 thereto after the application of the start signal 223 thereto, turns on and off the light-emitting diode 217 from the time when the ready signal 226 has been again applied after the light emission of the light emitting portion 202B. That is, when the photographing condition is outside of the flash output control range, the light-emitting diode 217 is turned on and off to thereby give a warning.

If the preparatory light emission is effected with the diaphragm blade stopped down, the aperture information by the resistance value of the variable resistor 210 operatively associated with the aperture preset ring need not be applied to the metering circuit 120.

As described above, in the speed light unit according to the present invention, the control circuit 202D is newly provided to the conventional automatic flash output control circuit and so, as previously described, during the preparatory light emission, the metering sensitivity of the metering circuit 120 can be varied in accordance with the correction signals 224a and 224b put out by the control circuit 202D and therefore, without carrying out actual photography, it is possible to know whether or not a proper exposure is obtained.

Figure 6:
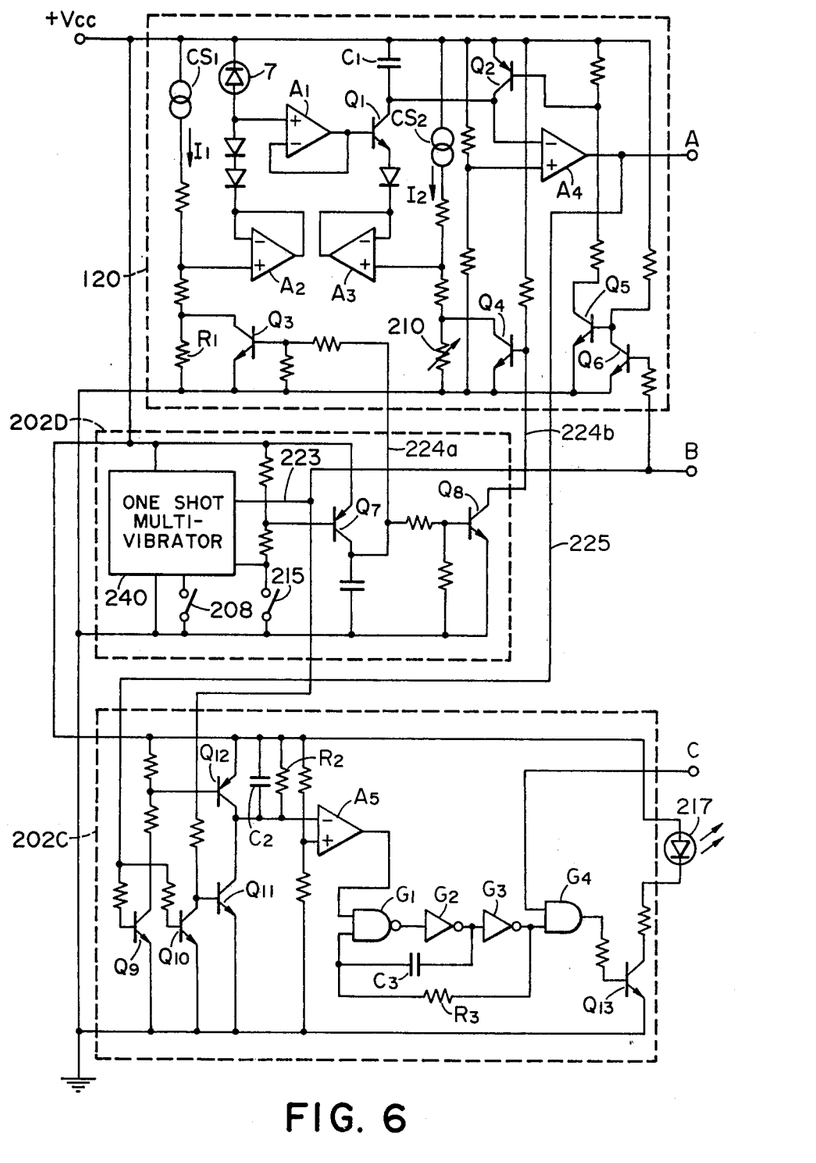
FIG. 6 is a circuit diagram of the metering circuit 120, control circuit 202D and flash output control display circuit 202C of FIG. 4.

The specific connections of the metering circuit 120, control circuit 202D and flash output control display circuit 202C which operate as hitherto described are shown in FIG. 6.

In FIG. 6, a terminal +Vcc is one which is supplied with power from a battery 236, and terminals A, B and C represent the terminals A, B and C in FIG. 5.

The metering circuit 120 is designed to cause a photocurrent proportional to the quantity of light received by the light-receiving device 7 to flow to an integrating capacitor C1. In the constant current charging circuit by the light-receiving device 7 of the integrating capacitor C1 which comprises amplifiers A1, A2, A3, transistor Q1 and diode, if the non-inverting input voltages of the amplifiers A2 and A3 are equal to each other, the integrating capacitor C1 is charged with a current equal to the photocurrent produced in the light-receiving device 7. When this charging voltage reaches a predetermined voltage, the output of an amplifier A4 operating as a comparator changes from "L" level to "H" level and the flash output control signal 225 is put out. The metering sensitivity of this metering circuit 120 is determined by the ratio of the photocurrent of the light-receiving device 7 to the charging current of the integrating capacitor C1. Accordingly, the more the charging current of the integrating capacitor C1, the higher the metering sensitivity. Provided to change the charging current of this integrating capacitor C1 are a resistor R1 and a variable resistor 210 which are supplied with power from constant current sources CS1 and CS2. It is to be understood that the current values I1 and I2 of the constant current sources CS1 and CS2 have temperature coefficients proportional to absolute temperature. The current I1 flowing to the resistor R1 is provided so as to be bypassed by a transistor Q3, and the current I2 flowing to the variable resistor 210 is provided so as to be bypassed by a transistor Q4. When the current I1 is bypassed by the transistor Q3, the output voltage of the amplifier A1 also drops following the drop of the output voltage of the amplifier A2, as a result of which the charging current of the integrating capacitor C1 is decreased. That is, the metering sensitivity drops due to the ON state of the transistor Q3. This amount of drop of the metering sensitivity by the resistor R1 is provided so as to be equal to the difference in metering value between during the ordinary metering for the same object and during the film surface metering. On the other hand, when the current I2 flows to the variable resistor 210, the output voltage of the amplifier A3 becomes high with a result that the charging current of the integrating capacitor C1 is decreased. That is, the metering sensitivity drops due to the OFF state of the transistor Q4. This amount of drop of the sensitivity by the variable resistor 210 is provided so as to be proportional to the amount of stop-down by the aperture preset ring. That is, when the aperture preset ring has been brought into its open position, the resistance value of the variable resistor 210 becomes zero. In the steady state, transistors Q3 and Q6 are in OFF state and transistors Q2, Q4 and Q5 are in ON state.

The control circuit 202D is provided with a one shot multivibrator 240 which puts out an "H" level voltage as a start signal 223 for a predetermined time upon closing of a synchroswitch 208 or a preparatory light emission switch 215.

Description will now be made of the operation of displaying whether or not the flash output contorl is possible by preparatory light emission.

When the preparatory light emission switch 215 is opened, the start signal 223 is put out from the one shot multivibrator 240 as described above while, at the same time, transistors Q7 and Q8 are turned on, with a result that the transistor Q3 is turned on and the transistor Q4 is turned off. Also, by the start signal 223, the transistor Q6 is turned on and the transistor Q2 is turned off. By the output of this start signal 223, the light emission of the light emitting portion 202B is started. Thereupon, the light-receiving device 7 receives the reflected light from the object resulting from this light emission as the phototaking light through the quick return mirror 5. However, since the transistor Q3 is in ON state as described above, the metering sensitivity has dropped so that it assumes the same metering value as the film surface metering. At the same time, the transistor Q4 is also in OFF state and therefore, as described above, the aperture information by the variable resistor 210 is applied and correspondingly, the metering sensitivity further drops. The light emitting portion 202B continues to emit light until the thus metered value becomes an optimal value. When the amount of emitted light reaches an optimal value, the amplifier A4 puts out a flash output control signal 225 to stop the light emission of the light emitting portion 202B.

In the flash output control display circuit 202C, the output of an amplifier A5 working as a comparator is "L" in the steady state. Accordingly, an oscillator comprising gate elements G1, G2 and G3 which is adapted to oscillate at a period determined by a capacitor C3 and a resistor R3 is not oscillating. Further, if the ready signal 226 is not applied to a gate element G4, the ON-OFF of transistor Q13 by the oscillation period cannot be effected and LED217 is neither turned on and off.

As described above, when the start signal 223 is applied, transistor Q11 is turned on to charge a capacitor C2 with a source voltage +Vcc. At this time, the output of the amplifier A5 assumes "H" level and an oscillation signal is obtained at the output of the gate element G3, but the ready signal 226 assumes "L" level simultaneously with the application of the start signal 223 and therefore, LED 217 is not turned on and off. When the input of the start signal 223 becomes null, transistor Q11 becomes turned off and the charge of the capacitor C2 is discharged through the resistor R2. Further, when the flash output control signal 225 is applied, transistors Q9, Q10 and Q12 become turned on and the charge of the capacitor C2 is quickly discharged by the transistor Q12. Accordingly, if the flash unit 102 is capable of flash output control after the application of the start signal 223, the flash output control signal 225 is applied and the output of amplifier A5 immediately changes from "H" level to "L" level. Also, when the photographing condition is outside of the flash output control range, the flash output control signal 225 is not applied and therefore, the output of the amplifier A5 is at "H" level during the time that the charge of the capacitor C2 is discharged by the resistor R2 until it assumes a predetermined voltage. During the period of this "H" level, the oscillator continues to oscillate, but when the ready signal 226 again assumes "H" level after the light emission of the light emitting portion 202B has been completed, LED 217 is driven by this oscillation signal through gate element G4 and transistor Q13 and turned on and off, thereby giving a warning to the photographer for a predetermined time.

Where the ready signal 226 is not provided from the first, the gate element G4 is omitted. In this case, if the photographing condition is within the flash output control range, LED 217 is turned on for a time corresponding to the difference between the input time of the start signal 223 and the input time of the flash output control signal 225. However, the light emission time of the discharge tube is generally very short and therefore, LED is turned on only for a moment.

Also, design may be made such that the divided voltage of the voltage dividing circuit provided by two resistors for dividing the source voltage Vcc applied to the non-inverting input terminal of the amplifier A4 which puts out the flash output control signal 225, namely, the reference voltage, fluctuates in response to the closing of the preparatory light emission switch 215. In this case, the resistor R1 is left as it is and the variable resistor 210 is eliminated. In addition, switching means similar in function to the transistors Q3 and Q4 and resistors corresponding to the variable resistor 210 and resistor R1 may be provided in that voltage dividing circuit.

In the embodiments hitherto described, use is made of a control circuit which reduces the metering sensitivity of the metering circuit during the preparatory light emission of the speed light. This is because the metering value by the ordinary metering is greater than the metering value by the film surface metering. That is, because the reflection factor of the phototaking light on the film surface is small. However, where the transmitting factor of the half-mirror provided on the quick return mirror is small with a result that the metering value by the film surface metering is greater, there may be provided a control circuit in which the transistor Q3 in the metering circuit 120 effects ON/OFF operation conversely to what has been described hitherto.

I claim:

1. In a system for taking pictures which is capable of flash photography and which includes a movable mirror device formed with a light-transmitting portion, the mirror being movable between an observation position in which the mirror reflects light from a phototaking lens to a view finder and also transmits the light from the phototaking lens through the light-transmitting portion, and a photographing position retracted from the photographing light path; a light receiving device positioned to be capable of receiving the light transmitted through the movable mirror device and the light reflected by a film surface, the light receiving device generating a photoelectric signal corresponding to the quantity of the received light; a trigger circuit for firing a flash tube in synchronization with exposure of the film surface by the light; and a flash unit having a flash output control device for controlling the quantity of light emission of the flash tube in response to the photoelectric output; the improvement comprising:

means for arbitrarily actuating said trigger circuit when said movable mirror device is in the observation position, the actuating means including means for correcting the response of said flash output control device to said photoelectric output in accordance with the difference, with respect to the same object, between the light quantity incident on said light receiving device when the movable mirror device is in the observation position and the light quantity incident on said light receiving device when the movable mirror is in the photographing position.

2. A system according to claim 1, wherein said flash output control means includes a circuit for integrating said photoelectric output with respect to time and generating a control signal for stopping the light emission of the flash tube when the integrated value amounts to a predetermined value; and said correcting means includes a circuit for adjusting the level of the predetermined value.

3. A system according to claim 2, wherein said flash unit includes means for displaying a state controlled by said flash output control device, in response to said control signal.

4. A system according to claim 2, further comprising a diaphragm device stopped down to a preset position during said exposure, a diaphragm preset member for setting the preset position of said diaphragm device, and means operatively associated with said diaphragm preset member to vary the level of the predetermined value of said integrating circuit by an amount corresponding to the difference between the outputs of said light receiving device during the opening of said diaphragm device and during the stop-down of said diaphragm device.

5. In a system for taking pictures which is capable of flash photography and which comprises a camera including a movable mirror device formed with a light-transmitting portion, the mirror being movable between an observation position in which the mirror reflects light from a phototaking lens to a view finder and also transmits the light from the phototaking lens through the light-transmitting portion and a photographing position retracted from the photographing light path, a light receiving device positioned to be capable of receiving the light transmitted through the movable mirror device and the light reflected by a film surface and generating a photoelectric output corresponding to the quantity of the received light and a metering circuit for generating an output in correspondence with said photoelectric output; and a flash unit comprising a trigger circuit for firing a flash tube in synchronization with exposure of the film surface by said light, a flash output control device for controlling the quantity of the light emission of the flash tube and means for electrically connecting the flash output control device to the camera; the improvement wherein:

said metering circuit includes means for amplifying said photoelectric output, and means having a transistor connected to the amplifying means and transmitting to said connecting means an electric current output corresponding to said photoelectric output.

6. A system according to claim 5, wherein said amplifying means includes means for generating an output which is a logarithmic compression of said photoelectric output, and said transistor is connected to the base of said amplifying means.

* * * * *